Figure 8:
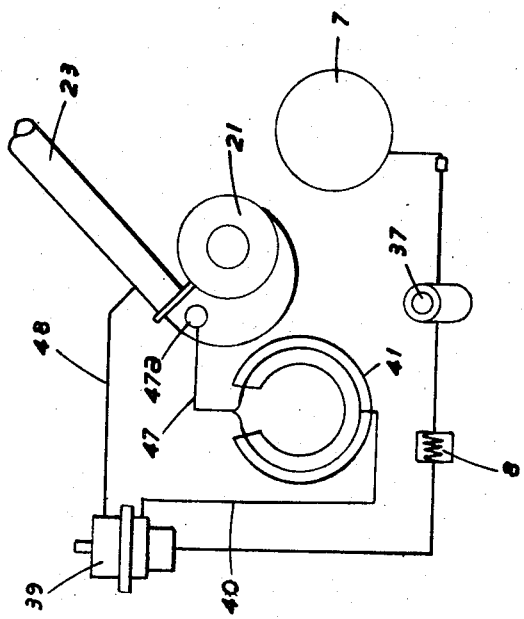

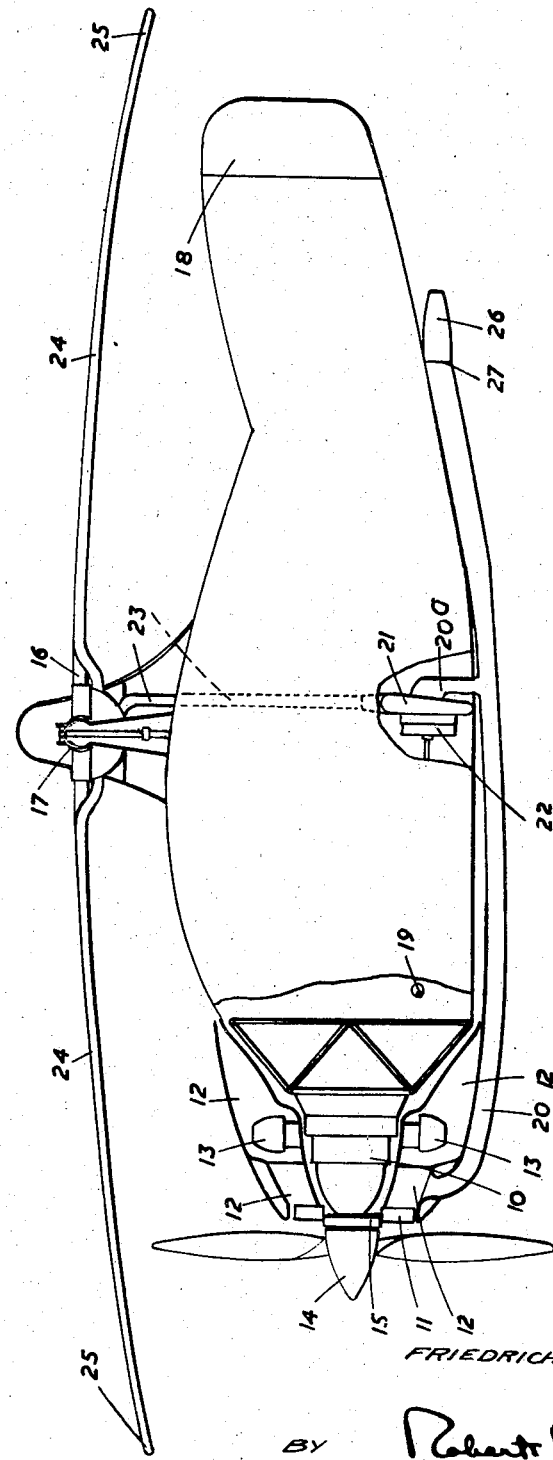

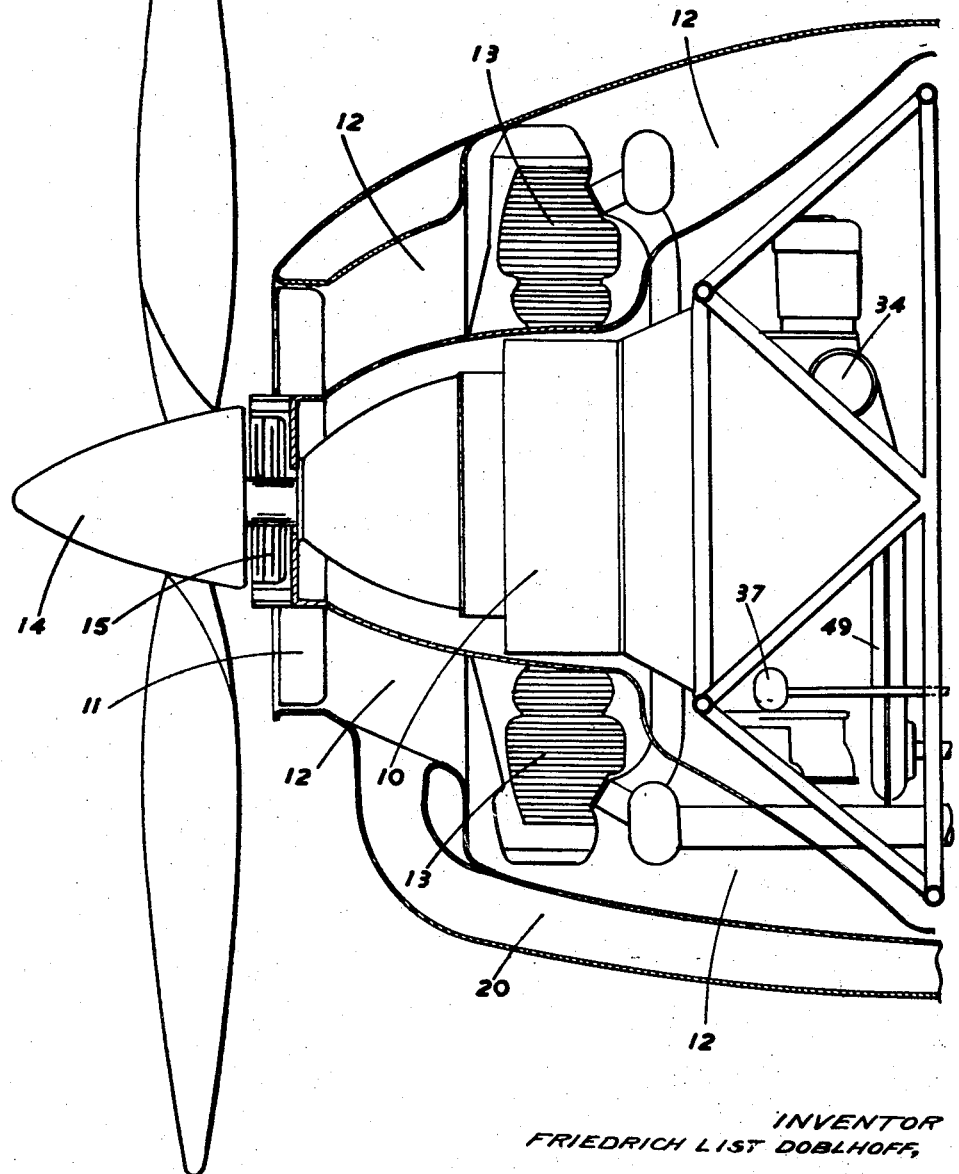

Feb. 6, 1951 F. L. DOBLHOFF 2,540,190
JET ROTATED ROTARY WING AIRCRAFT
Filed Oct. 23, 1946 6 Sheets-Sheet 3
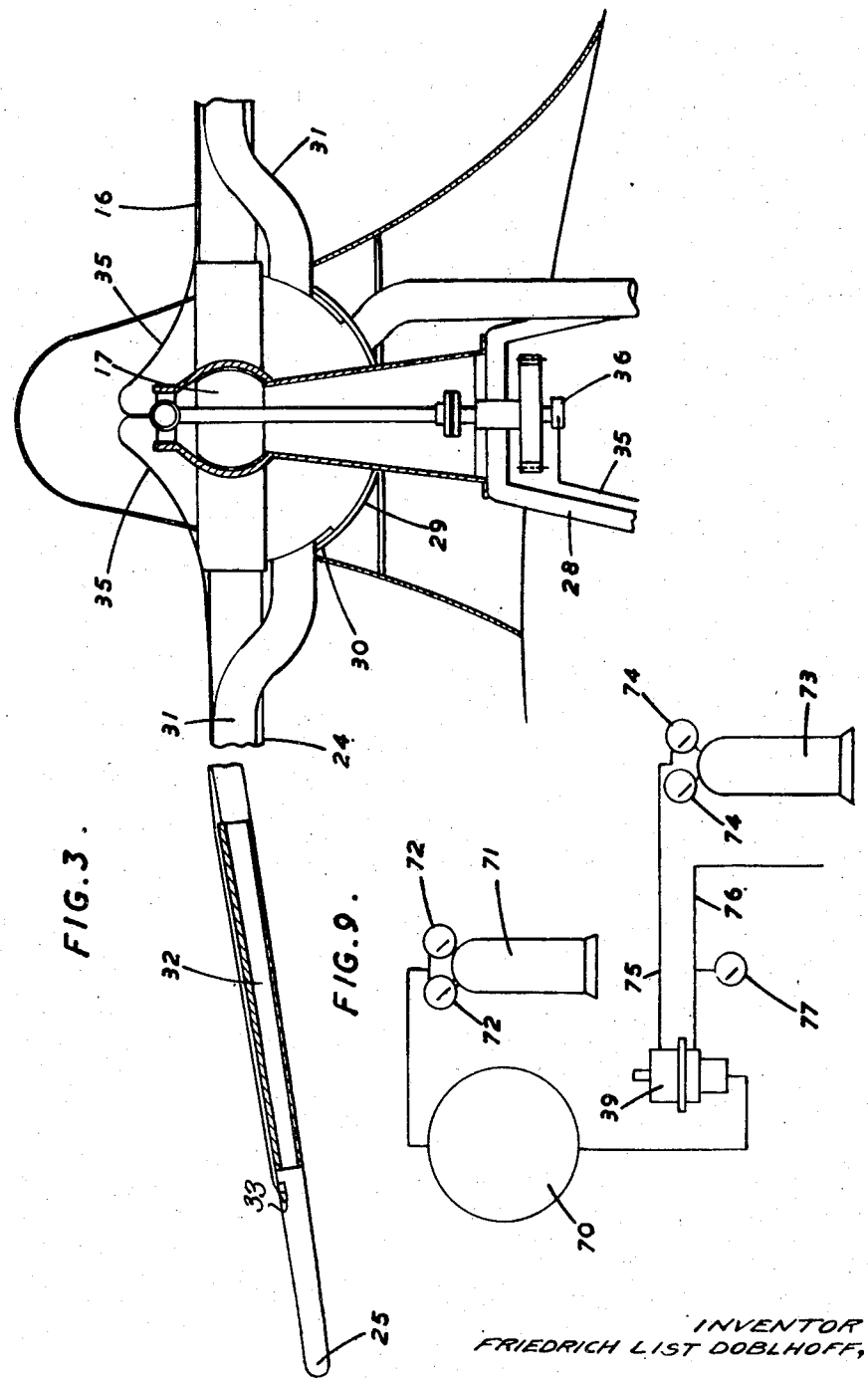
INVENTOR
FRIEDRICH LIST DOBLHOFF,
BY Robert B Larson
ATTORNEY

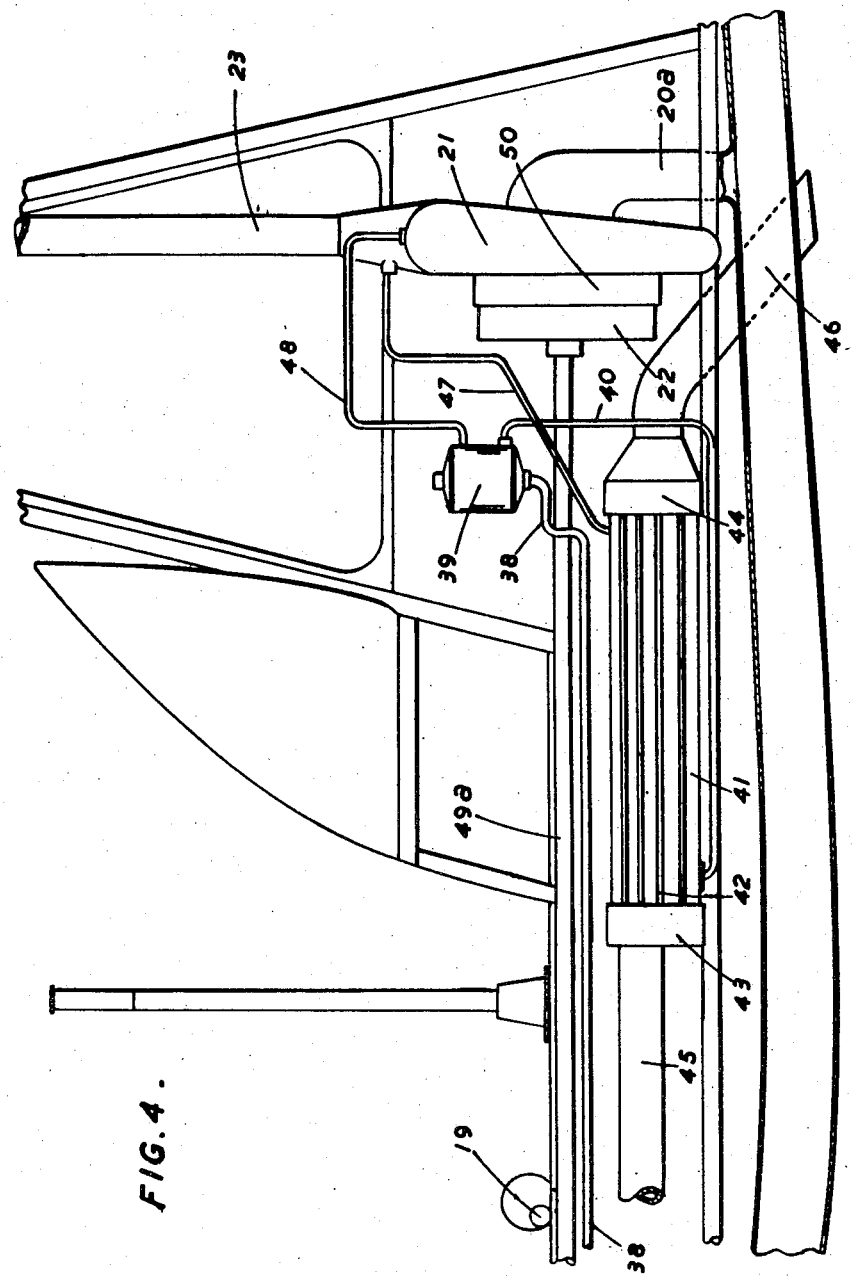

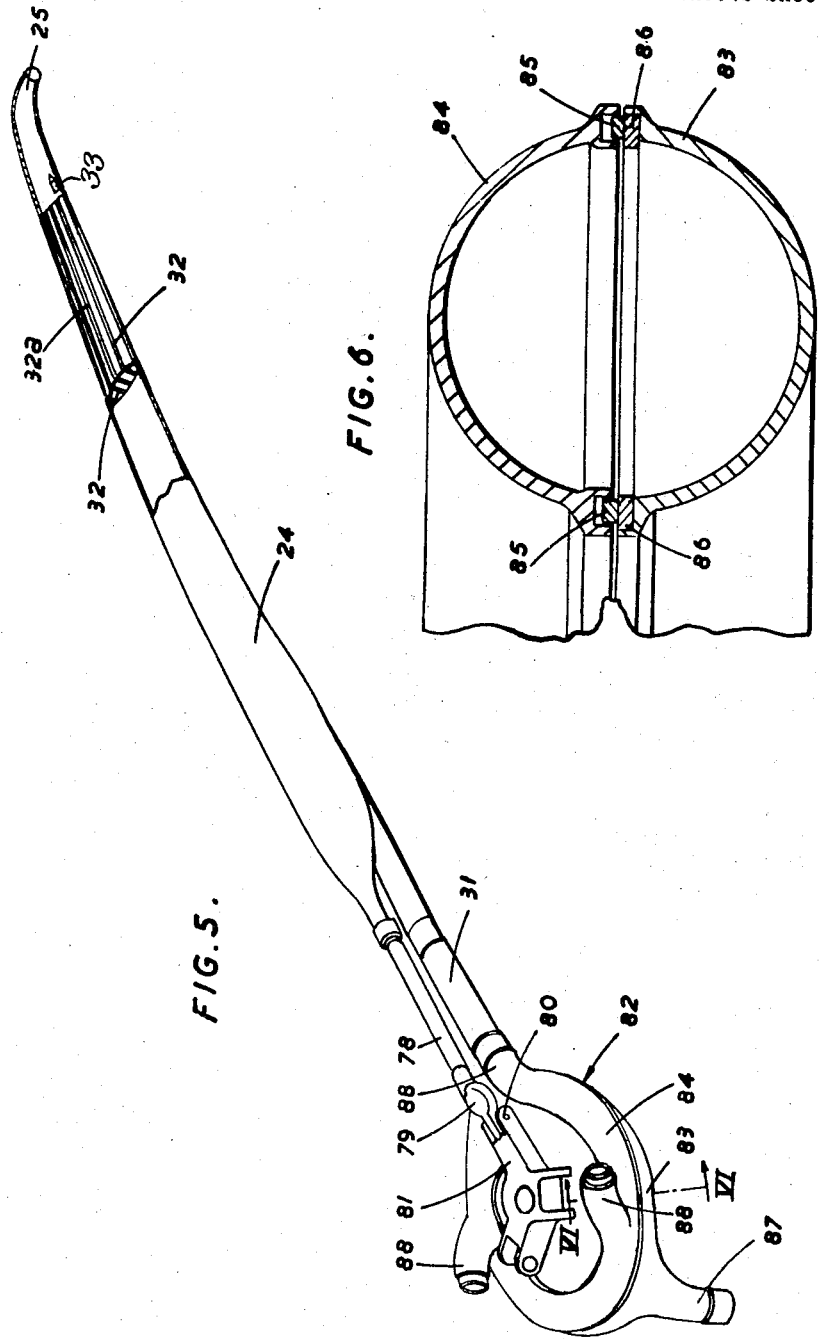

Patented Feb. 6, 1951

2,540,190

UNITED STATES PATENT OFFICE 2,540,190

JET ROTATED ROTARY WING AIRCRAFT

Friedrich List Doblhoff, Zell am See, Austria, assignor to The Fairey Aviation Company Limited, Hayes, Middlesex, England Application October 23, 1946, Serial No. 705,025
In Great Britain July 19, 1946

9 Claims. (Cl. 170—135.4)

It is known in rotary wing aircraft to provide an engine and propeller for forward propulsion and a rotary wing mounted on a pylon above the fuselage to sustain the aircraft, but such an arrangement, while enabling full use to be made of the engine power, does not give the features of vertical climb and hovering of a helicopter.

It has also been proposed to provide the rotor blades of a helicopter with jet propulsion units at their outer ends, but while such an aircraft can climb vertically and hover, it has a low forward speed, and, due to the use of the jets, it is difficult to obtain an economical fuel consumption. Moreover, while the use of jets to drive the rotor eliminates the heavy shafts and gearing often employed in helicopters, the location of the jet propulsion units at the outer ends of the blades gives rise to high loading of the rotor head due to centrifugal force.

It is an object of the invention to provide an aircraft with a high forward speed and an economical cruising fuel consumption, and also with the safety features of a helicopter, that is, ability to climb vertically and hover. A further object is, by the use of jets, to eliminate the complicated and heavy gearing usually employed in a helicopter to drive the rotor, and to reduce the centrifugal loading on the rotor head by supplying the jets with a compressed air-fuel mixture from within the aircraft, thus reducing the weight of the components located at the outer ends of the rotor blades.

According to the invention a rotary wing aircraft has an engine and a propeller engageable therewith for forward flight, jets located at the outer ends of the blades of a rotary wing to rotate said wing, and a compressor to supply fuel-air mixture under pressure for the jets, wherein said compressor is located within the body of the aircraft and arranged to deliver mixture through ducts leading through the blades to the jets.

The ducts may include a distributing duct located at the centre of the rotary wing and having a stationary portion into which the mixture is fed and a rotatable portion to convey said mixture to the blades.

Each blade may be hollow and may contain a combustion chamber for the mixture, ignition means within the combustion chamber, and a distributor to convey the burning mixture to the jet.

The engine may be arranged to drive either the compressor or the propeller at will.

Fuel may be introduced into the compressor on the pressure side thereof, and the quantity of fuel introduced may be related to the air pressure generated by the compressor. A control for connection with the fuel supply system of the aircraft may include a jet to permit a constant quantity of fuel to be passed to the compressor and a valve to permit an additional quantity to be passed in proportion to the air pressure exerted by said compressor. The valve may be operated by a diaphragm exposed to the air pressure, and movement of the diaphragm to open the valve may be arranged to be resisted by a second diaphragm exposed to the pressure of the fuel, and adjusting means may be provided to permit the control to be pre-set to give a desired mixture strength.

The rotary wing aircraft may have a cooling fan for the engine and a steering nozzle located aft of the axis of rotation of the rotary wing and arranged to be supplied with pressure air by said fan when the propeller is disengaged from the engine.

A vaporiser may be provided to vaporise the fuel prior to its introduction into the compressor, and may be heated by the exhaust gases of the engine.

Figure 7:
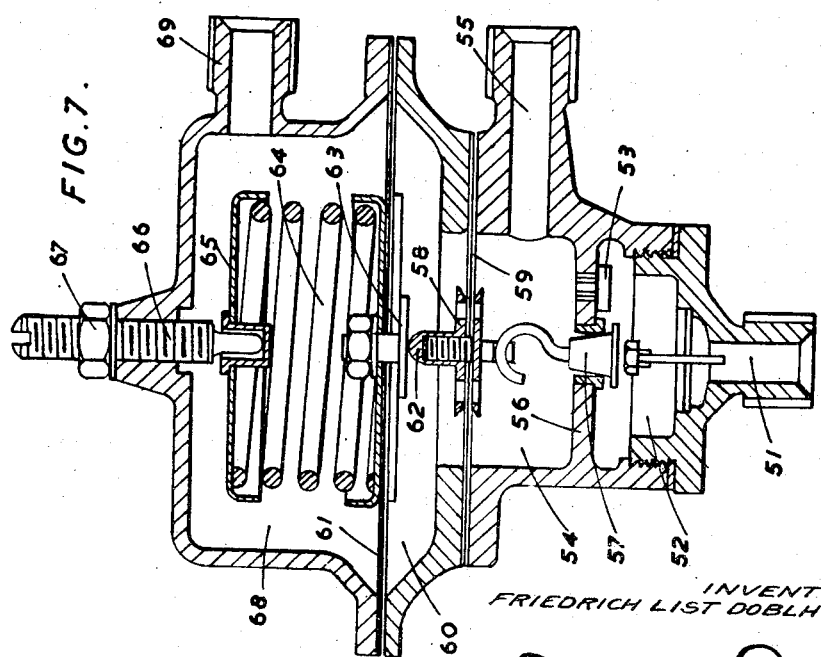

The invention will be described with reference to the accompanying drawings, in which:

Figure 1 is a diagrammatic sectional elevation of one form of aircraft according to the invention, Figure 2 is an enlarged sectional elevation of the nose of the aircraft, Figure 3 is an enlarged sectional elevation of the rotor head and a rotor blade, Figure 4 is an enlarged sectional elevation of part of the fuselage, Figure 5 is a diagrammatic perspective view of part of another form of rotor head to which is attached a rotor blade, Figure 6 is an enlarged cross-section on the line VI—VI, Figure 5, Figure 7 is an enlarged cross-section of a control box, Figure 8 is a diagrammatic representation of the fuel system, and Figure 9 is a diagrammatic representation of a pneumatic rig to pre-set a control box.

Referring to Figures 1 to 4 of the drawings, an aircraft has an engine 10 mounted in the nose and driving a fan 11 which draws air into a chamber 12 to pass over the cylinders 13 of the engine to cool them. A variable-pitch propeller 14 is arranged to be driven by the engine 10 through a clutch 15 to propel the aircraft and a rotor 16 auto-rotates during forward flight about a spherical bearing 17 to sustain the aircraft, thus permitting the aircraft to cruise at an economical fuel consumption. A rudder 18 is connected with a rudder-bar 19 to give lateral control.

When the aircraft is to be used as a helicopter, the clutch 15 is disengaged, the propeller 14 is feathered, and air is fed from the fan 11 through a duct 20 and a branch 20a to a compressor 21 driven from the engine through a clutch 22 so as to absorb the maximum power of the engine during take-off and climb. The compressor 21 delivers compressed air, into which fuel is injected, along a duct 23 to the rotor head, whence the fuel-air mixture is distributed to the interiors of rotor blades 24 and ignited and issues from constant-flow jets 25, which cause the rotor to rotate and produce the necessary lift. To give lateral control of the aircraft, the fan 11 forces air through the duct 20 to a nozzle 26, mounted at 27 about a vertical pivot and inter-connected with the rudder-bar 19, so as to be capable of directing a stream of air to port or starboard as required.

With reference to Figure 3, a pylon 28 supports the spherical bearing 17 on which the rotor blades 24 are mounted. To distribute the fuel-air mixture, a substantially hemispherical bowl is formed in two parts, a stationary part 29 and a rotatable part 30, and the upper and lower edges, respectively, of the two parts are arranged with overlapping seating surfaces to permit relative rotation of the parts while maintaining a gas-tight joint. The duct 23 debouches into the stationary part 29, and flexible ducts 31 lead from the rotatable part 30 to the rotor blades 24.

The construction of a rotor blade may be seen from Figures 3 and 5, although it is to be remembered that those parts of the rotor head and gas distributor shown in Figure 5 are not the same as those shown in Figure 3. The blade 24 is hollow, and serves as a continuation of the duct 31 over approximately two-thirds of the length of the blade. A number of partitions 32 are arranged longitudinally of the blade to form a distributor box 32a and a sparking plug 33 is disposed in the path of the gases after they leave the distributor box 32a so that combustion takes place between the outlet of the distributor box 32a and the nozzle 25. The distributor box serves to prevent back firing caused by the burning gases as they pass out of the jet 25, by cooling any back fires to a temperature below the ignition temperature of the mixture.

The sparking plugs 33 are supplied with current from a magneto 34 (see Fig. 2) through leads 35 and sliprings 36 (see Figure 3).

Liquid fuel is supplied from a suitable source (not shown) by an engine-driven pump 37 (see Figure 2) via a pipe 38 to a control box 39 (see Figure 4), which meters the fuel, as will be described in detail below, and allows it to pass through a pipe 40 into a vaporiser 41.

The vaporiser 41 has passages 42 extending through it and in communication at their ends with chambers 43, 44, but not with the interior of the vaporiser, and the chambers 43, 44 are in communication respectively with a pipe 45 leading from the exhaust manifold of the engine 10 and with an outlet 46 to lead the exhaust gases into the airstream. The hot exhaust gases, therefore, are led through the passages 42 to warm and vaporise the fuel in the vaporiser 41. The vaporised fuel is conveyed from the vaporiser 41 to the duct 23 by means of a pipe 47. A pipe 48 connecting the control box 39 with the duct 23 serves as a pressure balance pipe to control the control box 39.

The compressor 21 is connected with the engine 10 by gearing indicated generally at 49, Figure 2, a shaft 49a, a clutch 22, and a gearbox 50. The compressor clutch 22 and the propeller clutch 15 are interconnected by means not shown and are so arranged that when one is engaged the other is disengaged, and vice versa, thus allowing a safe changeover from climb or hovering to forward flight.

Turning now to Figure 7, the purpose of the control box 39 is to meter into the compressed air passing from the compressor 21, liquid fuel at a rate dependent on the fuel pressure and air pressure. The control box 39 has an inlet 51 to which fuel is delivered through the pipe 38 from the engine-driven pump 37 and thence to a chamber 52, whence it passes through a jet 53 into a chamber 54 and out through an outlet 55 to the pipe 40 leading to the vaporiser 41. The quantity of fuel passed by the jet 53 is dependent solely on the size of the jet. The partition 56 separating the chambers 52 and 54 is apertured centrally and has a needle valve 57 in the aperture, the needle valve being secured to one side of a member 58 mounted centrally in a diaphragm 59. A chamber 60 is enclosed by the diaphragm 59 and another diaphragm 61, and the member 58 has a boss 62 which abuts against a member 63 mounted centrally in the diaphragm 61. The diaphragm 61 is loaded by a spring 64 which abuts against a collet 65 carried on a threaded rod 66, which extends through a threaded aperture in the top of the control box 39, and, in conjunction with a lock-nut 67, serves as an adjusting means for the spring pressure on the diaphragm 61. A chamber 68, one side of which is constituted by the diaphragm 61, has an inlet 69 connected with the pressure balance pipe 48.

In addition to the fuel passed by the jet 53, fuel may be passed by the needle valve 57. The pressure of fuel in the chamber 54 acts upwardly on the diaphragm 59, tending to keep the needle valve 57 closed, but the pressure from the compressor acting downwardly in the chamber 68 on the diaphragm 61 causes said diaphragm, through the members 63 and 58, to force the diaphragm 59 downwards and hence open the needle valve 57 and permit an amount of fuel to pass into the chamber 54 and outlet 55 over and above that passed by the jet 53. The extra amount of fuel passed will be in proportion to the pressure in the chamber 68, in turn, is in proportion to the amount of air being delivered to the jets.

Figure 8 shows a fuel system in diagrammatic form. Fuel is delivered from a fuel tank 7 through an engine-driven pump 37 and pressure relief valve 8 at constant pressure to the control box 39, which is connected on the fuel outlet side by the pipe 40 with the vaporiser 41, which delivers the vaporised fuel through the pipe 47 and jet 47a into the compressor 21. While adjustment of the threaded rod 66 (Figure 7) of the control box 39 affords a means of pre-setting the mixture strength, it is desirable to calibrate the control box, and a rig for doing this is shown diagrammatically in Figure 9. A control box 39 to be calibrated is connected with a fuel tank 70 having an air-bottle 71 from which a desired pressure may be applied to the diaphragm 59 (Figure 7) through a regulating valve and read off pressure gauges 72. Another air-bottle 73 fitted with pressure gauges 74 supplies a desired pressure through a pipe 75 to the diaphragm 61 (Figure 7) and the metered fuel passes out through a pipe 76 fitted with a pressure gauge 77. By means of such a rig the control box 39 may be pre-set to pass the requisite amount of fuel under given conditions of fuel and air pressure.

An alternative form of rotor head is shown in Figures 5 and 6. The blades 24 are carried on arms 78 each mounted on drag and flapping axes 79 and 80 respectively on a spider 81, and surrounding the spider is a toroidal duct 82 formed in two sections, a lower section 83 stationary within the pylon of the aircraft and an upper section 84 rotatable with the blades. The mating edges of the two sections are provided with seals 85, 86 (Figure 6) to give a gas-tight joint. The lower section 83 has a branch 87 connected with the duct 23, and the upper section has three branches 88 for connection with the flexible ducts 31 leading to the interior of the blades 24.

The liquid fuel used in aircraft according to the invention may be petrol or it may even be paraffin. The provision of a vaporiser heated by the engine exhaust gases enables paraffin to be vaporised satisfactorily, and a further disadvantage of paraffin, namely its tendency to separate out of suspension due to centrifugal force in the rotating blades, is overcome by the provision in each blade of a distributor box, which prevents late burning and high fuel consumption.

Instead of a plate-type clutch between the propeller and the engine, a simple clutch may be arranged to utilize the feathering and unfeathering of the propeller to assist in the clutching and declutching. For example, the propeller in an alternative arrangement is mounted freely on the gear part of its shaft and is also permitted axial travel. At the forward end of the shaft are splines arranged to engage with the propeller, and means within the cabin are provided to move the propeller axially forward on its shaft. When the propeller is moved forward to engage with the splines and then unfeathered, it will be rotated by the engine, and by its tractor effect will maintain itself on the forward splined portion of the shaft. When declutching is required, the propeller is merely feathered, and during feathering will be blown back along the shaft out of engagement with the splines, or the pitch may be momentarily reversed. The advantage of such an arrangement is that in neither of the positions are the heavy bearings and spring of a plate-type clutch required.

Instead of the nozzle 26 there may be provided a small propeller located at the tail of the aircraft and driven by the engine during climb and hovering to direct a slipstream on to the rudder 18 and enable normal control to be effected thereby, by altering the angular setting of the rudder and thus producing a controllable moment about the vertical axis of the rotor.

Any suitable form of engine may be employed, and in addition to the utilization of the exhaust head to vaporise the fuel, fuel may be employed as a coolant for the engine and thus be preheated before it is delivered to the vaporiser. This is of particular advantage during hovering, when the cooling effect of the airstream is reduced.

The variable pitch propeller 14 and the fan 11 may be combined, the central part of the propeller being of fixed pitch to act as a fan, and the outer parts of the blades being of variable pitch to act as a normal propeller.

During forward flight the compressor, instead of being declutched, may be throttled on the suction side. While wasting more power than would declutching, this saves the weight of the compressor clutch. A small quantity of air is admitted to the compressor to keep it cool, and this air blows out at the jets and decreases their drag during autorotation. If fuel is allowed to be mixed with the air and burned just prior to the changeover from forward flight to climb or hovering, the jets are thereby enabled to warm up ready for the changeover.

The passages 42 of the vaporiser are preferably of heat proof material, so that during forward flight they are always warmed up ready to vaporise the fuel for the jets, but if desired the exhaust system may be arranged to by-pass the vaporiser during forward flight, so as to avoid overheating the passages when fuel is not being vaporised.

The vaporiser 41 may be employed as a silencer, and the passages therein may be supported at suitable intervals to prevent resonance therefrom. The vaporiser may be insulated, for example, with glass wool.

There may be a number of vaporisers arranged around a corresponding number of exhaust pipes.

I claim:

1. In a rotary wing aircraft, a rotary wing provided with blades, propulsion jets located at the outer ends of said blades, a source of fuel supply, fuel metering means connected to said source, a compressor located within the aircraft, a control connection between said compressor outlet and said fuel metering means, whereby said fuel metering means regulates the quantity of fuel fed to said compressor outlet according to the air pressure generated by said compressor, said metering means including a metering jet permitting a constant quantity of fuel to be passed, a valve having a diaphragm exposed to said air pressure and tending to open said valve, a second diaphragm exposed to the pressure of said fuel and resisting said first-mentioned diaphragm, and adjusting means permitting said valve to be pre-set to give a desired mixture strength, said valve permitting an additional quantity of fuel to be passed in proportion to and by the operation of said air and fuel pressures respectively on said diaphragms, a second connection between the metering means and the compressor outlet to carry fuel to the compressor outlet for mixing the fuel with air, ducts passing through said blades and connecting said compressor with said propulsion jets, and ignition means located within said blades in the path of said mixture.

2. In a rotary wing aircraft, a rotary wing provided with blades, propulsion jets located at the outer ends of said blades, an air compressor carried by the aircraft, a source of fuel under pressure, means for injecting fuel into the air passing from the compressor to the blades for admixture with the air, and fuel metering means located between said source and said injecting means for regulating the quantity of fuel injected, said injecting means including a fuel carrying connection between said metering means and said compressor, said metering means including a metering jet permitting a constant quantity of fuel to be passed, a valve positioned to permit the flow of additional fuel, a first diaphragm, connecting means placing one side of said diaphragm in communication with the output side of the compressor and operatively associated with the valve so that an increase in pressure in said output tends to open the valve, a second diaphragm exposed to the incoming fuel pressure and operatively associated with the valve so that an increase in fuel pressure tends to close the valve, means including ducts passing through said blades for connecting said compressor with said propulsion jets, and ignition means located within the blades in the path of the mixture.

3. The arrangement set forth in claim 2, and biasing means assisting the pressure of air on said first diaphragm.

4. The arrangement set forth in claim 3, and presettable means for varying the pressure of said biasing means on said first diaphragm.

5. The arrangement set forth in claim 2, and a heat exchanger located between said metering device and said injecting means for vaporizing the fuel fed to said injecting means.

6. The arrangement set forth in claim 2, said source of fuel under pressure comprising a fuel pump, an internal combustion engine driving said fuel pump, and a heat exchanger heated by the products of combustion from said engine, said heat exchanger being located between said metering device and said injecting means for vaporizing the fuel fed to said injecting means.

7. The arrangement as set forth in claim 2, and at least one substantially flat vertical partition positioned in each blade in the path of the fuel and air mixture and inwardly of said ignition means for cooling the mixture passing through the blades below the ignition temperature of the mixture to assure against premature ignition of the mixture by backfires.

8. A fluid metering device for controlling flow of a fluid in accordance with the pressure of a control fluid, comprising a fluid inlet, a fluid outlet, an orifice permitting flow of fluid from said inlet to said outlet, a variable flow valve for permitting additional flow of fluid from said inlet to said outlet, a first diaphragm having a surface exposed to the control fluid and means for transmitting motion from said diaphragm to said valve to urge the valve toward a more open position upon an increase in the pressure of said control fluid, a second diaphragm having a surface exposed to the pressure of the metered fluid, and means for transmitting motion from said diaphragm to said valve to urge the valve to a more closed position upon an increase in the pressure of the metered fluid, said second motion transmitting means forming part of said first motion transmitting means.

9. A fluid metering device for controlling flow of a fluid in accordance with the pressure of a control fluid, comprising a fluid inlet, a fluid outlet, an orifice permitting flow of fluid from said inlet to said outlet, a variable flow valve for permitting additional flow of fluid from said inlet to said outlet, a first diaphragm having a surface exposed to the control fluid and means for transmitting motion from said diaphragm to said valve to urge the valve toward a more open position upon an increase in the pressure of said control fluid, a second diaphragm having a surface exposed to the pressure of the metered fluid, means for transmitting motion from said diaphragm to said valve to urge the valve to a more closed position upon an increase in the pressure of the metered fluid, biasing means assisting the pressure of said control fluid on said first diaphragm, and presettable means for varying the force exerted on said first diaphragm by said biasing means.

FRIEDRICH LIST DOBLHOFF.

REFERENCES CITED

The following references are of record in the file of this patent:

UNITED STATES PATENTS

| Number | Name | Date |
|---|---|---|
| 523,734 | Shaw | July 31, 1894 |
| 2,329,323 | Benz | Sept. 14, 1943 |
| 2,330,056 | Howard | Sept. 21, 1943 |
| 2,371,687 | Gerhardt | Mar. 20, 1945 |
| 2,384,088 | Hagen | Sept. 4, 1945 |
| 2,396,130 | Sbrilli | Mar. 5, 1946 |
| 2,397,357 | Kundig | Mar. 26, 1946 |
| 2,446,129 | Dalton | July 27, 1948 |
| 2,457,936 | Stalker | Jan. 4, 1949 |

FOREIGN PATENTS

| Number | Country | Date |
|---|---|---|
| 633,136 | France | Oct. 22, 1927 |
| 687,482 | France | Apr. 28, 1930 |
| 795,517 | France | Jan. 8, 1936 |
| 227,151 | Great Britain | Jan. 12, 1925 |
| 366,450 | Great Britain | of 1930 |
| 556,865 | Great Britain | Oct. 26, 1943 |
| 556,866 | Great Britain | Oct. 26, 1943 |